United States Patent
Zhu et al.

(10) Patent No.: US 8,843,102 B2
(45) Date of Patent: Sep. 23, 2014

(54) METHOD AND SYSTEM FOR PAGING AN EMERGENCY SERVICE USER

(75) Inventors: Chunhui Zhu, Shenzhen (CN); Jing Wang, Shenzhen (CN); Shuang Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 319 days.

(21) Appl. No.: 13/257,932

(22) PCT Filed: Nov. 4, 2009

(86) PCT No.: PCT/CN2009/074794
§ 371 (c)(1),
(2), (4) Date: Feb. 14, 2012

(87) PCT Pub. No.: WO2011/020256
PCT Pub. Date: Feb. 24, 2011

(65) Prior Publication Data
US 2012/0135701 A1    May 31, 2012

(30) Foreign Application Priority Data
Aug. 17, 2009    (CN) .................. 2009 1 0163155

(51) Int. Cl.
*H04W 4/00*    (2009.01)
*H04W 68/00*    (2009.01)
*H04M 11/04*    (2006.01)
*H04W 76/00*    (2009.01)
*H04W 4/22*    (2009.01)

(52) U.S. Cl.
CPC ............ *H04W 68/00* (2013.01); *H04W 76/007* (2013.01); *H04W 4/22* (2013.01)
USPC ..................... 455/404.1; 455/426.1; 455/434; 455/458

(58) Field of Classification Search
CPC ..... H04W 4/22; H04W 68/00; H04W 76/007; H04W 24/00; H04M 3/00; H04M 1/00; H04M 11/04; G01S 5/0242
USPC ................... 455/404.1–404.2, 410–411, 415, 455/418–420, 426.1, 456.1–456.3, 455/456.5–456.6, 457–456, 466, 517, 521, 455/550.1, 554.1, 556.2, 557–558, 455/560–561, 7, 16, 41.2, 404–404.2, 434, 455/457–458, 524–525, 552.1, 555, 556.1, 455/569–561; 370/328, 338, 400–402, 432, 370/492, 501, 911–913; 379/45, 46, 49
See application file for complete search history.

(56) References Cited

U.S. PATENT DOCUMENTS

| | | | |
|---|---|---|---|
| 8,072,953 B2 * | 12/2011 | Mukherjee et al. ............ | 370/338 |
| 8,165,587 B2 * | 4/2012 | Dahlen et al. ................. | 455/439 |
| 2002/0163906 A1 * | 11/2002 | Diachina et al. .............. | 370/349 |
| 2002/0184346 A1 * | 12/2002 | Mani ............................. | 709/220 |
| 2009/0181647 A1 * | 7/2009 | Benco et al. ................... | 455/413 |
| 2009/0181672 A1 * | 7/2009 | Horn et al. .................. | 455/435.1 |
| 2009/0186595 A1 | 7/2009 | Son et al. | |
| 2009/0265542 A1 * | 10/2009 | Khetawat et al. ............. | 713/151 |
| 2009/0305699 A1 * | 12/2009 | Deshpande et al. .......... | 455/434 |
| 2010/0041393 A1 * | 2/2010 | Kwon et al. ................. | 455/426.1 |
| 2010/0075698 A1 * | 3/2010 | Rune et al. .................... | 455/458 |
| 2010/0210288 A1 * | 8/2010 | Kim et al. ..................... | 455/458 |
| 2010/0311386 A1 * | 12/2010 | Edge et al. ................. | 455/404.1 |
| 2011/0058658 A1 * | 3/2011 | Li .................................. | 379/45 |

FOREIGN PATENT DOCUMENTS

| | | |
|---|---|---|
| CN | 101001445 A | 7/2007 |
| CN | 101222750 A | 7/2008 |
| CN | 101277524 A | 10/2008 |
| JP | 2012527133 A | 11/2012 |
| WO | 2008083581 A1 | 7/2008 |
| WO | 2008131689 A1 | 11/2008 |
| WO | 2009091741 A1 | 7/2009 |
| WO | 2010130094 A1 | 11/2010 |

OTHER PUBLICATIONS

Zte, Stop Paging optimization for UE with emergency service, 3GPP TSG-SA WG2 Meeting #75 Sep. 4, 2009.
International Search Report in international application No. PCT/CN2009/074794, mailed on May 27, 2010.

English Translation of the Written Opinion of the International Search Authority in international application number: PCT/CN2009/074794, mailed on May 27, 2010.

* cited by examiner

*Primary Examiner* — Meless Zewdu
(74) *Attorney, Agent, or Firm* — Oppedahl Patent Law Firm LLC

(57) ABSTRACT

The present disclosure discloses a method for paging an emergency service user. When a mobility management unit is configured to support the paging optimization in a core network, the mobility management unit does not perform paging optimization when a UE has an emergency bearer service. That is to say, a paging message is sent to all base stations (including the CSG-mode home base station that does not authorize the UE) in the paging tracking list registered by the UE. A core network gateway can notify the mobility management unit of whether the UE has an emergency bearer service. Alternatively, the mobility management unit configured to use the paging optimization, after learning that the service data is to be sent to the UE, checks the current service type of the UE to determine whether the UE has an emergency bearer service. Accordingly, the present disclosure further discloses a system for paging an emergency service user. The present disclosure solves the problem that the mobility management unit and home base station gateway using the paging optimization cannot page the UE which uses the emergency service, so as to increase the success rate of establishing communications and improve the user experience.

21 Claims, 6 Drawing Sheets

METHOD AND SYSTEM FOR PAGING AN EMERGENCY SERVICE USER

TECHNICAL FIELD

The present disclosure relates to the field of paging service in communication, in particular to a method and a system for paging an emergency service user in a home base station system architecture.

BACKGROUND

Home base station is a small and low-power base station deployed in indoor places such as family and office, mainly to provide users with higher service rate, reduce the fund required for the high-rate services, and compensate for insufficient coverage of existing distributed cellular wireless communication systems. The advantages of the home base station are cheap, convenient, low power output, plug and play, broadband access, using single-mode terminals and so on.

The home base station may be applied in the $3^{rd}$ Generation (3G) or Long Term Evolution (LTE) mobile communication networks. The home base station is called home node B (HNB) for short when applied in the 3G network or Home Evolved NodeB (HeNB) for short when applied in the LTE network. For facilitating management of the home base station, a new network element, i.e., home base station gateway, is introduced in the radio access network. The home base station gateway mainly functions to validate the security of home base station, process the registration of home base station, maintain and manage the operation of home base station, configure and control home base station according to the requirements of operators, and exchange data between a core network and the home base station. FIG. 1 is a diagram illustrating the network architecture of a 3G home base station, in which the 3G Home Base Station (HNB) is connected to a Home Base Station Gateway (HNB GW) through a newly defined Iuh interface. The home base station gateway provides IuPS and IuCs interfaces to the packet switched and circuit switched domains of a core network. It is mandatory for the 3G network to be deployed with the home base station gateway for shielding the impact on User Equipment (UE) and network side after the introduction of home base station. However, it is optional for the LTE network to be deployed with the home base station gateway, so two connections exist for home base station and core network in the LTE network: direct connection from the home base station to the core network element, and connection from the home base station to the core network element through a gateway, as shown in FIGS. 2 and 3. For the scenario in FIG. 3 of introducing a home base station, the home base station might not be integrated with the functions of user interface, and the user interface is directly established between the home base station and the user interface gateway of the core network, thereby flattening the user interface and reducing the delay of data transmission, as shown in FIG. 4.

In FIG. 1, the packet switched domain includes a Service GPRS Support Node (SGSN) and a Gateway GPRS Support Node (GGSN).

In FIGS. 2 to 4, the core network gateway is also called user interface gateway, i.e., System Architecture Evolution Gateway (SAE-GW), including a Serving Gateway (S-GW) and a Packet Data Network Gateway (P-GW).

Closed Subscriber Group (CSG) is a concept introduced after the introduction of home base station. Generally, the subscribers in a family or an enterprise form a CSG identified by a CSG ID. The home base stations serving the subscribers in the CSG have the same CSG ID. The subscribers can access many home base stations corresponding to multiple CSGs, such as office and home thereof, by subscribing to operators. Therefore, the concept of allowed CSG list is introduced and saved in the home subscriber data servers at UE and network sides. For the LTE, the home subscriber data servers of network are Home Subscriber Server (HSS) and for 3G networks, the home subscriber data servers of network are Home Location Register (HLR). The UE selects radio cells mainly by the list, and the home base station notifies the UE of the CSG ID and usage mode thereof through broadcast. After obtaining a broadcast message, if it is found that the base station is in the closed usage mode and the CSG ID is not in the allowed CSG list saved thereby, the UE believes that the cell of the home base station is not suitable for access and automatically selects other cells suitable for access, so as to avoid frequent access attempts, thereby reducing the consumption of battery and air interface resources. When the UE initializes the access, the home subscriber data server at the network side sends the allowed CSG list subscribed to by a subscriber to a mobility management unit of the core network. The mobility management unit of the core network performs access control to the UE using the list. For the 3G network, the mobility management unit is an SGSN. And for the LTE network, the mobility management unit is a Mobility Management Entity (MME). If the UE accesses the core network through an unauthorized CSG-mode home base station, the core network will reject the access of such UE. The home base station may also be used as a general base station. Then, at this moment, the access mode of the home base station is the open mode. In this mode, the home base station may be accessed by any UE. The UE accessed in such mode will not be subjected to the access control by the mobility management unit. Likewise, the home base station can be in a hybrid mode, namely, some UEs adopting the CSG-mode access, and some UEs adopting the open mode access.

When a UE is idle, the air interface connection between the UE and the base station is released, and if there are external data required to be sent to the UE through a network, an MME/SGSN needs to inform the base station in the Tracking Area (TA) list where the UE is located to page the UE, so as to inform the UE to establish an air interface connection. And when the home base station gateway is available, the MME/SGSN needs to inform the home base station gateway that informs the base station to page the UE. According to different network architectures, when an MMS is directly connected to a home base station, the MME learns the access mode of the home base station. And when the MME/SGSN is connected to the home base station through a home base station gateway, the MME/SGSN does not learn the access mode of the home base station, which mode is only known by the home base station gateway.

In the scenario where the home base station is directly connected to the MME, in order to reduce the resource waste caused by paging, it is possible to use the paging optimization, that is to say, for the CSG-mode home base station, it is not required to inform the CSG-mode home base station to page the unauthorized UE. Namely, not paging such base station whose cell is the CSG-mode CSG cell, and the UE does not subscribe to the CSG of the CSG cell. Herein, the base station is called the CSG-mode home base station that does not authorize the UE. When a home base station is connected to an MME/SGSN through a Home Base Station Gateway (HeNB GW/HNB GW), the MME/SGSN will send a paging message including an allowed CSG list of a UE to the home base station gateway, and the home base station gateway determines to use the paging optimization. That is to say, for the CSG-mode home base station, it is not necessary to inform it to page the unauthorized UEs.

For the subscribers using the emergency service, a home base station providing such service may be accessed. At this point, two scenarios are available.

1. A UE is normally attached to a network under a base station in normal service, and then establishes an emergency service. After completion of the emergency service, the UE enters into an idle state and moves under a closed home base station. The CSG ID of the closed home base station is not in the allowed CSG list of the UE, but, in a broadcast message, the home base station indicates that it may provide the emergency service, so that the UE opts for residing in the CSG cell.

2. A UE is started under a closed home base station. The CSG ID of the closed home base station is not in the allowed CSG list of the UE, but, in a broadcast message, the home base station indicates that it can provide the emergency service, so that the UE initializes an emergency attachment to a network, after which the UE enters the idle state.

In the two scenarios above, the UE having the emergency service may reside in the unauthorized CSG-mode home base station. The MME/SGSN or Home Base Station Gateway (HeNB GW/HNB GW) will not be informed to page the UE according to the paging optimization of the prior art, such that the UE cannot be paged, and communication failure occurs.

SUMMARY

The technical problem to be solved by the present disclosure is to provide a method and a system for paging an emergency service user, so that the idle UEs having the emergency service may be paged.

To solve the technical problem above, the disclosure provides a method for paging an emergency service user, the method includes that:

when a mobility management unit is configured to support paging optimization in a core network, the mobility management unit does not perform the paging optimization when a UE has an emergency bearer service.

The step of that the mobility management unit configured to use the paging optimization does not perform the paging optimization when a UE has an emergency bearer service comprises that:

after receiving a downlink data packet to be sent to the UE, a core network gateway notifying the mobility management unit that service data included in the downlink data packet is the emergency service data when the service data included in the downlink data packet is emergency service data;

after learning that there is emergency data to be sent to the UE, the mobility management unit configured to use the paging optimization sends a paging message to all base stations, including the CSG-mode (Closed Subscriber Group mode) home base station that does not authorize the UE, in a paging tracking list registered by the UE; and the CSG-mode home base station pages the UE.

The step of that the mobility management unit configured to use the paging optimization does not perform the paging optimization when a UE has an emergency bearer service comprises that:

after receiving a downlink data packet to be sent to the UE, the core network gateway notifies the mobility management unit that service data included in the downlink data packet is emergency service data when the service data included in the downlink data packet is the emergency service data;

after learning that there is emergency service data to be sent to the UE, the mobility management unit sends a paging message to all home base station gateways in a paging tracking list registered by the UE, to notify the home base station gateways that there is the emergency service data to be sent to the UE;

the home base station gateway configured to use the paging optimization pages all base stations, including the CSG-mode home base station that does not authorize the UE, in the tracking area of the paging message; and the CSG-mode home base station pages the UE.

The step of that the mobility management unit configured to use the paging optimization does not perform the paging optimization when a UE has an emergency bearer service comprises that:

after learning that there is emergency data to be sent to the UE, the mobility management unit configured to use the paging optimization checks a current service type of the UE, and if the UE currently has an emergency service, sends a paging message to all base stations, including the CSG-mode home base station that does not authorize the UE, in the paging tracking list registered by the UE; and the CSG-mode home base station that does not authorize the UE pages the UE.

The step of that the mobility management unit configured to use the paging optimization does not perform the paging optimization when a UE has an emergency bearer service comprises that:

after receiving a downlink data notification from the core network gateway, the mobility management unit checking the current service type of the UE, and if the UE currently has an emergency service, pages all home base station gateways in the tracking area list registered by the UE, a paging message includes an emergency indication;

after receiving the paging message from the mobility management unit, the home base station gateway configured to use the paging optimization paging all base stations, including the CSG-mode home base station that does not authorize the UE, in the tracking area of the paging message according to the emergency indication in the paging message; and the CSG-mode home base station pages the UE.

To solve the technical problem above, the present disclosure provides a method for paging an emergency service user, the method includes that:

after receiving a downlink data packet to be sent to a UE, a core network gateway notifies a mobility management unit that the service data included in the downlink data packet is emergency service data when the service data included in the downlink data packet is the emergency service data;

after learning that there is emergency data to be sent to the UE, the mobility management unit configured to use the paging optimization sends a paging message to all base stations, including CSG-mode home base station that does not authorize the UE, in a paging tracking list registered by the UE; and the CSG-mode home base station pages the UE.

Furthermore, the method may further have the following characteristic that:

the core network gateway notifies the mobility management unit that there is the emergency service data to be sent to the UE by sending a downlink data notification including an emergency indication to the mobility management unit.

Furthermore, the method may further have the following characteristic that:

the core network gateway is an SAE-GW, and the mobility management unit is an MME.

To solve the technical problem above, the disclosure provides a method for paging an emergency service user, the method includes that:

after receiving a downlink data packet to be sent to a UE, a core network gateway notifies a mobility management unit that service data included in the downlink data packet is emergency service data when the service data included in the downlink data packet is the emergency service data;

after learning that there is emergency service data to be sent to the UE, the mobility management unit sends a paging message to all home base station gateways in a paging tracking list registered by the UE to notify the home base station gateways that there is the emergency service data to be sent to the UE;

the home base station gateway configured to use the paging optimization pages all base stations, including a CSG-mode home base station that does not authorize the UE, in a tracking area of the paging message; and the CSG-mode home base station pages the UE.

Furthermore, the method may further have the following characteristic that:

the core network gateway notifies the mobility management unit that there is the emergency service data to be sent to the UE by sending a downlink data notification including an emergency indication to the mobility management unit.

Furthermore, the method may further have the following characteristics that:

the mobility management unit makes an emergency indication be included in the paging message, sends the paging message to the home base station gateway, and notifies the home base station gateway that there is the emergency service data to be sent to the UE; and the paging message further includes a tracking area where the home base station gateway is located in the tracking area list registered by the UE.

Furthermore, the method may further have the following characteristics that:

The step of that the home base station gateway configured to use the paging optimization pages all base stations in the tracking area of the paging message comprising:

the home base station gateway configured to use the paging optimization learns that there is emergency service data to be sent to the UE according to the emergency indication in the paging message; and the home base station gateway pages all base stations in the tracking area of the paging message.

Furthermore, the method may further have the following characteristics that:

for a LTE access, the core network gateway is an SAE-GW, and the mobility management unit is an MME; and for a 3G access, the core network gateway is a GGSN, and the mobility management unit is an SGSN.

To solve the technical problem above, the present disclosure provides a method for paging an emergency service user, the method includes that:

after learning that there is service data is to be sent to the UE, a mobility management unit configured to use the paging optimization checks a current service type of the UE, and if the UE has an emergency service, sends a paging message to all base stations, including the CSG-mode home base station that does not authorize the UE, in a paging tracking list registered by the UE; and the CSG-mode home base station that does not authorize the UE pages the UE.

To solve the technical problem above, the present disclosure provides a method for paging an emergency service user, the method includes that:

a mobility management unit receives a downlink data notification from a core network gateway, checks the current service type of a UE, and if the UE has an emergency service, pages all home base station gateways in a tracking area list registered by the UE, wherein an emergency indication is included in a paging message;

after receiving the paging message from the mobility management unit, the home base station gateway configured to use the paging optimization pages all base stations, including a CSG-mode home base station that does not authorize the UE, in a tracking area of the paging message according to the emergency indication in the paging message; and the CSG-mode home base station pages the UE.

To solve the technical problem above, the disclosure provides a system for paging an emergency service user, the system includes that: a core network gateway, a mobility management unit and a CSG-mode home base station, in which the core network gateway is for, after receiving a downlink data packet to be sent to a UE, notifying the mobility management unit that service data included in the downlink data packet is emergency service data when the service data included in the downlink data packet is the emergency service data;

the mobility management unit configured to use the paging optimization is for, after learning that the emergency data is to be sent to the UE, sending a paging message to all base stations, including the CSG-mode home base station that does not authorize the UE, in a paging tracking list registered by the UE; and the CSG-mode home base station is for paging the UE according to the received paging message.

Furthermore, the system may further have the following characteristics that:

the core network gateway is further for notifying the mobility management unit of the emergency service data to be sent to the UE by sending a downlink data notification including an emergency indication to the mobility management unit.

To solve the technical problem above, the present disclosure provides a system for paging an emergency service user, the system include that: a core network gateway, a mobility management unit, a home base station gateway and a CSG-mode home base station, in which the core network gateway is for, after receiving a downlink data packet to be sent to a UE, notifying the mobility management unit that service data included in the downlink data packet is emergency service data if the service data included in the downlink data packet is the emergency service data;

the mobility management unit is for, after learning that there is emergency service data to be sent to the UE, sending a paging message to all home base station gateways in the paging tracking list registered by the UE to notify the home base station gateways of the emergency service data to be sent to the UE;

the home base station gateway configured to use the paging optimization is for sending a paging message to page the corresponding base stations, including the CSG-mode home base station that does not authorize the UE according to the received paging message; and the CSG-mode home base station is for paging the UE according to the received paging message.

Furthermore, the system may further have the following characteristics that:

the core network gateway is further for notifying the mobility management unit of the emergency service data to be sent to the UE by sending a downlink data notification including an emergency indication to the mobility management unit.

Furthermore, the system may further have the following characteristics that:

the mobility management unit is further for making an emergency indication and a tracking area, where the home base station gateway is located in the tracking area list registered by the UE, be included in the paging message, sending the paging message to the home base station gateway, and notifying the home base station gateways of the emergency service data to be sent to the UE; and the home base station gateway is further for learning that there is emergency service data to be sent to the UE according to the emergency indication in the paging message and paging all base stations in the tracking area of the paging message.

To solve the technical problem above, the disclosure provides a system for paging an emergency service user, the system includes that: a mobility management unit and a CSG-mode home base station, in which the mobility management unit configured to use the paging optimization, after learning that the emergency data is to be sent to the UE, for checking the current service type of the UE, and if the UE currently has an emergency service, sending a paging message to all base stations, including the CSG-mode home base station that does not authorize the UE, in a paging tracking list registered by the UE; and the CSG-mode home base station is for paging the UE according to the received paging message.

To solve the technical problem above, the present disclosure provides a system for paging an emergency service user, the system includes that: a core network gateway, a mobility management unit, a home base station gateway and a CSG-mode home base station, in which the mobility management unit is for, after receiving a downlink data notification from the core network gateway, checking the current service type of a UE, and if the UE currently has an emergency service, paging all home base station gateways in the tracking area list registered by the UE, wherein the paging message includes an emergency indication;

the home base station gateway configured to use the paging optimization is for, after receiving the paging message from the mobility management unit, paging all base stations, including the CSG-mode home base station that does not authorize the UE, in a tracking area of the paging message according to the emergency indication in the paging message; and the CSG-mode home base station is used for paging the UE according to the received paging message.

The present disclosure solves the problem that the mobility management unit and home base station gateway using the paging optimization cannot page the UE which uses the emergency service, so as to increase the success rate of establishing communications and improve the user experience.

DETAILED DESCRIPTION

Figure 1:
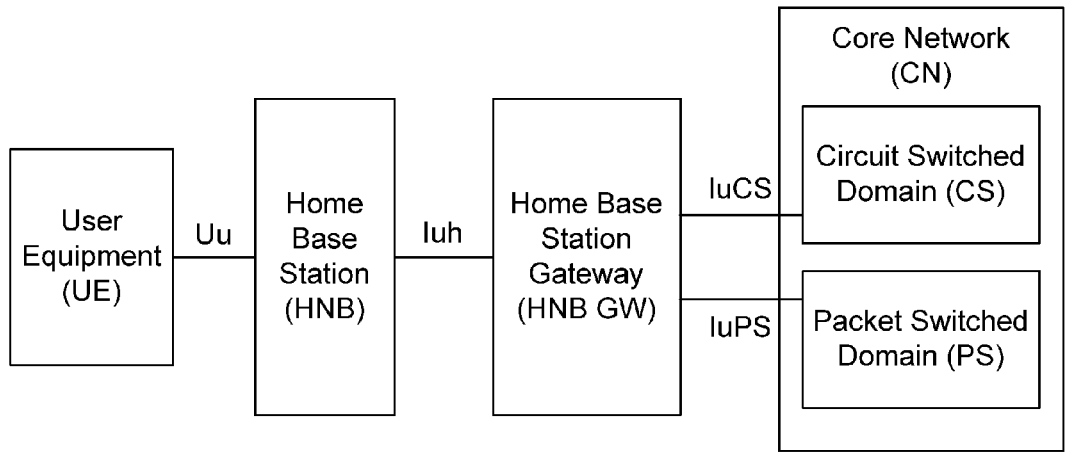
FIG. 1 is a diagram showing the network architecture of a 3G home base station.

In the present disclosure, when a mobility management unit is configured to support paging optimization in a core network, and when a UE has an emergency bearer service, the mobility management unit does not perform paging optimization. Specifically, when no home base station gateway is available in the network architecture, a core network gateway, after receiving a downlink data packet to be sent to the UE, notifies the mobility management unit of the emergency service data if the service data included in the downlink data packet is the emergency service data. And the mobility management unit configured to use the paging optimization, after learning that the emergency data is to be sent to the UE, sends a paging message to all base stations, including the CSG-mode home base station that does not authorize the UE, in the paging tracking list registered by the UE. Alternatively, the mobility management unit configured to use the paging optimization, after learning that the emergency data is to be sent to the UE, checks the current service type of the UE, and if the UE currently has an emergency service, sends a paging message to all base stations, including the CSG-mode home base station that does not authorize the UE, in the paging tracking list registered by the UE.

When the home base station gateway is available in the network architecture, the core network gateway, after receiving a downlink data packet to be sent to the UE, notifies the mobility management unit of the service data included in the downlink data packet is emergency service data when the service data included in the downlink data packet is the emergency service data. The mobility management unit, after learning that there is emergency service data to be sent to the UE, sends a paging message to all home base station gateways in the paging tracking list registered by the UE to notify the home base station gateways of the emergency service data to be sent to the UE. And the home base station gateway configured to use the paging optimization pages all base stations, including the CSG-mode home base station that does not authorize the UE, in the tracking area of the paging message. Alternatively, the mobility management unit, after receiving a downlink data notification from the core network gateway, checks the current service information of a user saved thereby, and if it is found that the UE currently has an emergency service, sends a paging message including an emergency indication to all home base station gateways in the paging tracking list registered by the UE, and the home base station gateway configured to use the paging optimization, after receiving the paging message from the mobility management unit, pages all base stations, including the CSG-mode home base station that does not authorize the UE, in the tracking area of the paging if the paging message indicates that the UE currently has the emergency service.

The present disclosure will be described below in detail with reference to the accompanying drawings and embodiments.

First Embodiment

Figure 2:
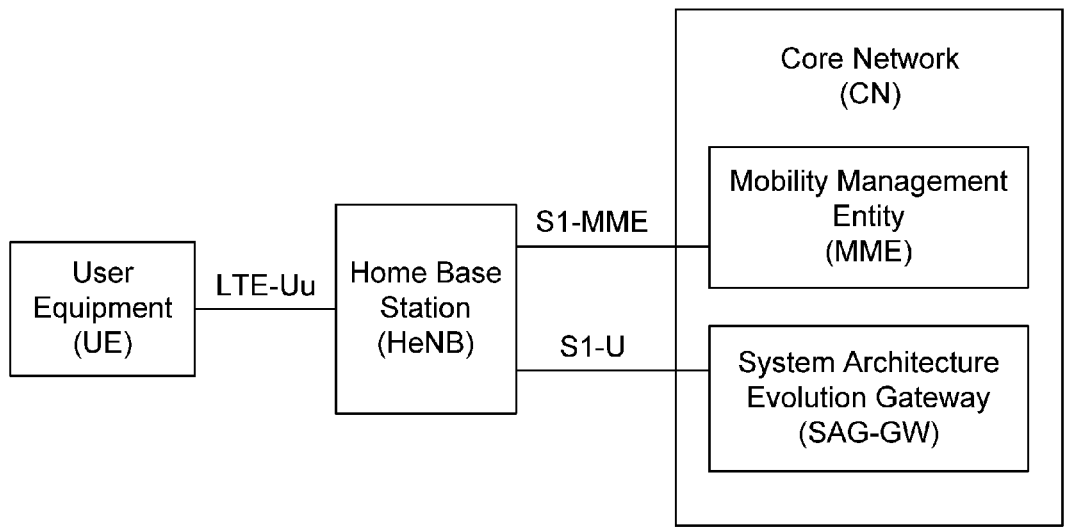
FIG. 2 is a diagram showing the network architecture of an LTE home base station with a direct connection between a home base station and a core network element.
Figure 5:
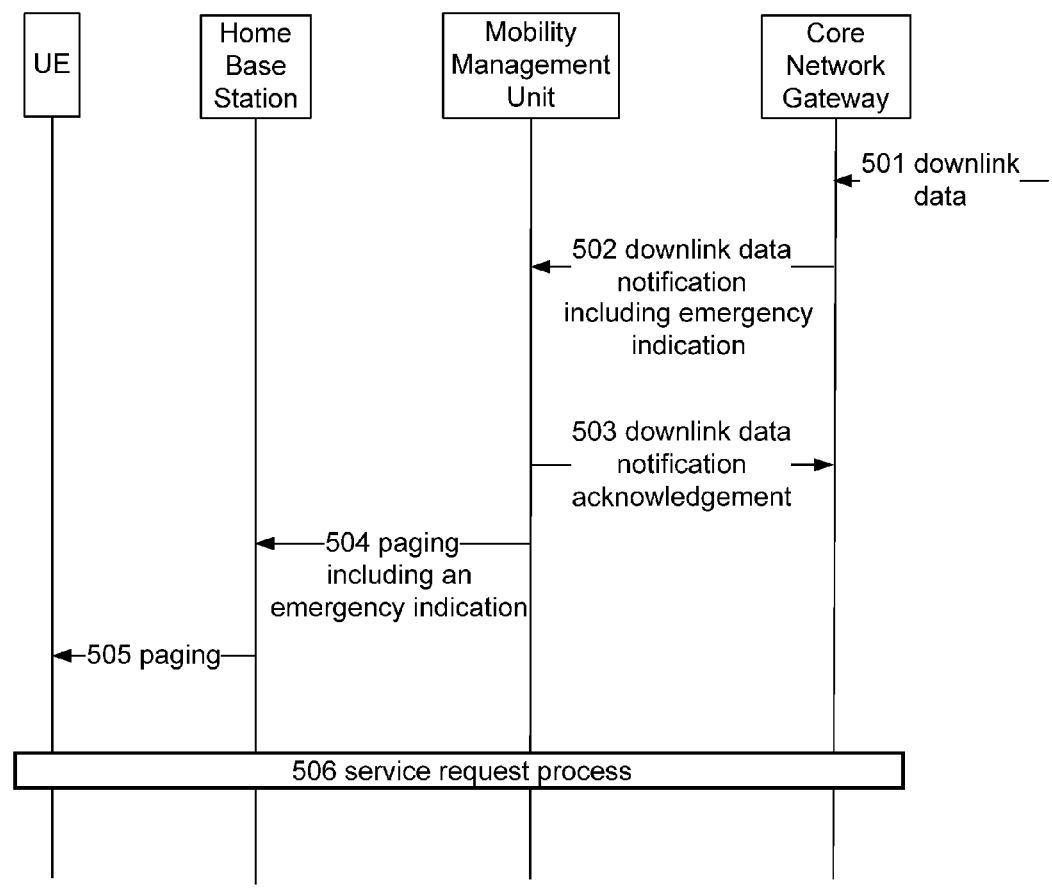
FIGS. 5 and 6 show the embodiments without the home base station gateway under the coverage of an Evolved Universal Terrestrial Radio Access Network (EUTRAN) or a Universal Terrestrial Radio Access Network (UTRAN)

This embodiment is applied under the coverage of EUTRAN or UTRAN. The network architecture is shown in FIG. 2, where a home base station is directly connected with a core network element. At this point, a UE which has established an emergency service bearer with a core network is in an idle state and resides in a CSG-mode home base station that does that does not authorize the UE. When the downlink emergency service data needs to be sent to the UE over the bearer, an MME configured to use the paging optimization initializes a paging to the UE. As illustrated in FIG. 5, the specific steps are specified below.

Step 501: The core network gateway, i.e., SAE-GW, receives a downlink data packet to be sent to the UE, and learns that the service data included in the downlink data packet is the emergency service data according to the destination address of the data packet, the destination address being an address for the UE emergency service.

Step 502: The core network gateway sends a downlink data notification including an emergency indication to the Mobility Management Unit (MME), in which if the core network gateway learns that the service data included in the downlink data packet is the non-emergency service data, the downlink data notification may include a non-emergency indication, or does not include an emergency or non-emergency indication.

Step 503: The mobility management unit sends a downlink data notification acknowledgement to a gateway.

Step 504: The mobility management unit configured to use the paging optimization, if learning that there is emergency service data to be sent to the UE according to the emergency indication in the received downlink data notification, pages all base stations, including the CSG-mode home base station not authoring the UE, in the paging tracking list registered by the UE.

Because the downlink data notification message is sent by the core network gateway through a tunnel, the message has the relevant tunnel identifier corresponding to the UE in the MME, thus the MME learns of which UE the message is directed to.

When the downlink data notification indicates that the downlink data is the non-emergency service data, the mobility management unit configured to use the paging optimization adopts a solution of paging optimization to page all base stations, except the CSG-mode home base station that does not authorize the UE, in the paging tracking list registered by the UE. Therefore, the result is that the UE cannot be paged and normal service cannot be performed.

Step 505: The CSG-mode home base station pages the unauthorized UE.

Step 506: After receiving the paging, the UE initiates a service request flow, establishes a connection to an air interface of the network, and receives the emergency service downlink data from the core network gateway.

Second Embodiment

Figure 6:
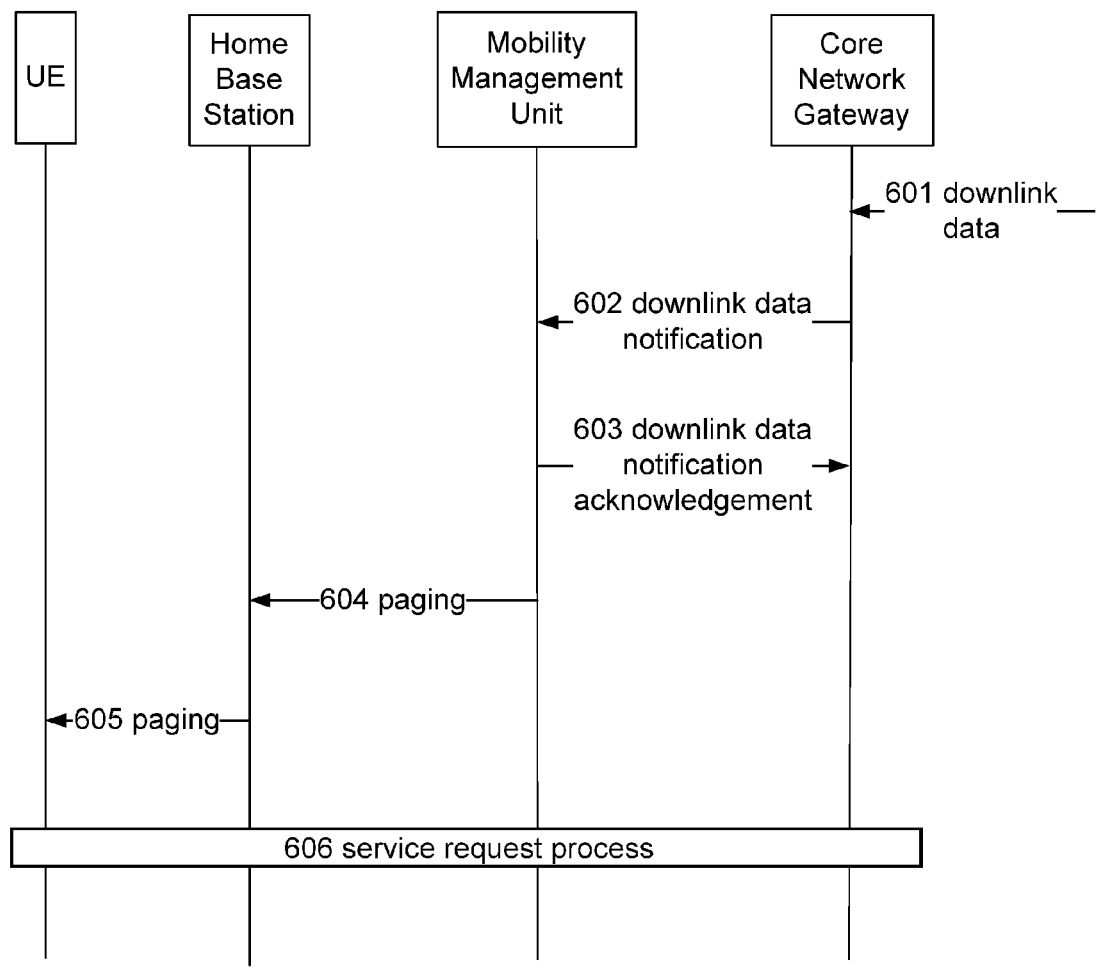

This embodiment is applied under the coverage of EUTRAN or UTRAN. The network architecture is shown in FIG. 2, where a home base station is directly connected with a core network element. At this point, a UE that has established an emergency service bearer with a core network is in an idle state and resides in a CSG-mode home base station that does not authorize the UE. When the downlink emergency service data needs to be sent to the UE over the bearer, an MME configured to use the paging optimization initializes a paging to the UE. As illustrated in FIG. 6, the specific steps are specified below.

Step 601: The core network gateway, SAE-GW, receives a downlink data packet to be sent to the UE.

In this embodiment, the core network gateway does not need to check whether the service data included in the downlink data packet is the emergency service data.

Step 602: The core network gateway sends a downlink data notification to the Mobility Management Unit (MME).

Step 603: The mobility management unit sends a downlink data notification acknowledgement to a gateway.

Step 604: The mobility management unit configured to use the paging optimization, after learning that the service data is to be sent to the UE according to the received downlink data notification, checks whether the current service type of the UE has an emergency service by checking whether the Access Point Name (APN) of the current service of the user is an emergency APN or by checking whether the Allocation and Retention Priority (ARP) of the current service of the user is an emergency service dedicated ARP, and sends a paging message to all base stations, including the CSG-mode home base station that does not authorize the UE, in the paging tracking list registered by the UE.

If the service data to be sent to the UE is the non-emergency service data, and, meanwhile, the current service information of the UE saved in the mobility management unit indicates that the UE currently has the emergency service (i.e. emergency APN or emergency service dedicated ARP), all base stations in the paging tracking list registered by the UE will be paged too.

Step 605: The CSG-mode home base station pages the unauthorized UE.

Step 606: After receiving the paging, the UE initiates a service request flow, establishes a connection to an air interface of the network, and receives the emergency service downlink data from the core network gateway.

Third Embodiment

Figure 3:
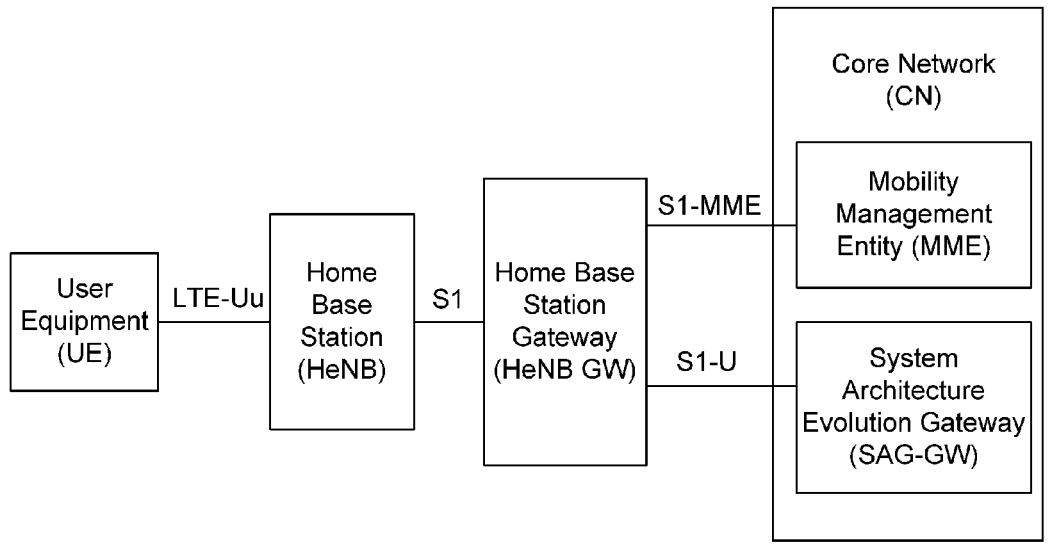
FIG. 3 is a diagram showing the network architecture of an LTE home base station with a connection between a home base station and a core network element through a gateway.
Figure 4:
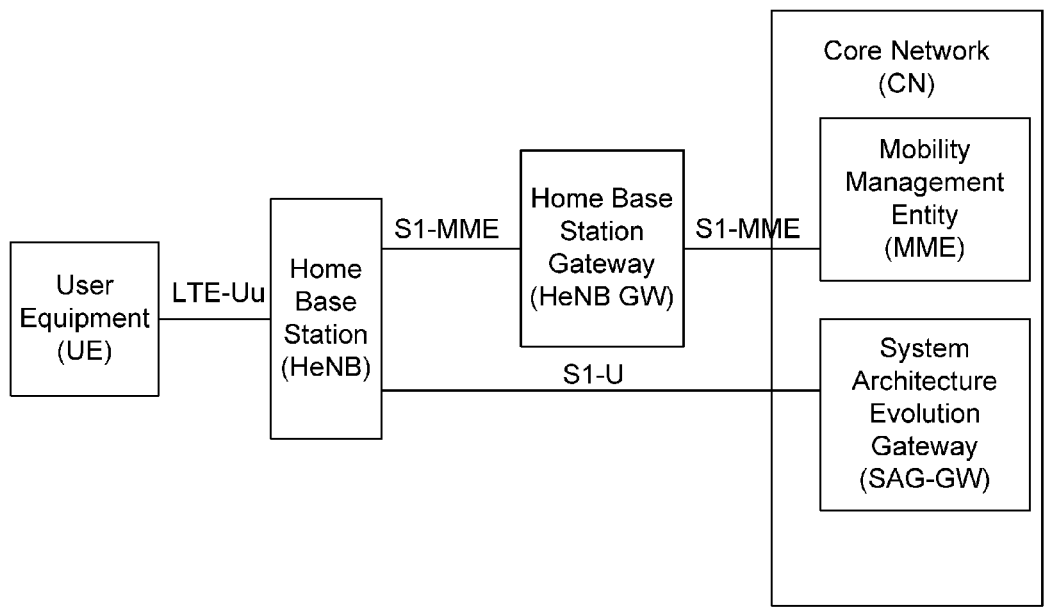
FIG. 4 is a diagram showing the network architecture of an LTE home base station with the home base station being connected with a core network element through a gateway, where the home base station gateway may not be integrated with the functions of a user interface.
Figure 7:
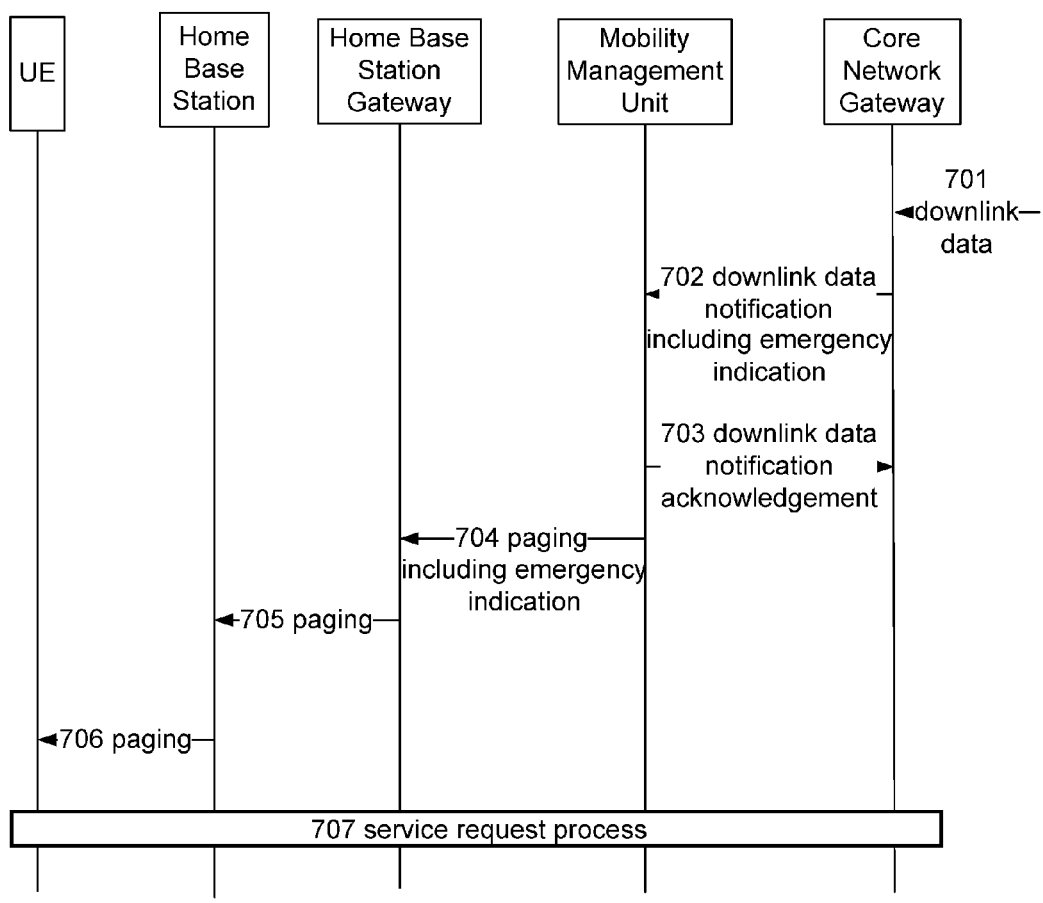
FIGS. 7 and 8 are the diagrams showing a system for paging an emergency service user according to embodiments of the disclosure (without the home base station gateway).

This embodiment is applied under the coverage of EUTRAN or UTRAN. The network architecture is shown in FIG. 1, FIG. 3, or FIG. 4, where a home base station is connected with a core network element through a home base station gateway. At this time, a UE which has established an emergency service bearer with a core network is idle and resides in a CSG-mode home base station that does not authorize it. When the downlink emergency service data needs to be sent to the UE over the bearer, an MME/SGSN and the home base station gateway configured to use the paging optimization initialize a paging to the UE. As illustrated in FIG. 7, the specific steps are as follows.

Step 701: The core network gateway, for example, SAE-GW for LTE access or GGSN for 3G access, receives a downlink data packet to be sent to the UE, and learns that the service included in the downlink data packet is an emergency service according to the destination address of the data packet, the destination address being an address for the UE emergency service.

Step 702: The core network gateway sends a downlink data notification including an emergency indication to the Mobility Management Unit (MME or SGSN), in which if the core network gateway learns that the service data included in the downlink data packet is the non-emergency service data, the downlink data notification may include a non-emergency indication, or does not include an emergency or non-emergency indication.

Step 703: The mobility management unit sends a downlink data notification acknowledgement to a gateway.

Step 704: The mobility management unit, if learning that there is emergency service data to be sent to the UE according to the emergency indication in the downlink data notification, pages all home base station gateways, including the home base station gateway corresponding to the CSG-mode home base station that does not authorize the UE, in the paging tracking list registered by the UE. And the paging message includes an emergency indication and a tracking area where the home base station gateway is located in the tracking area list registered by the UE.

If the downlink data notification received by the mobility management unit includes a non-emergency indication or does not include an emergency or non-emergency indication, the mobility management unit may make the non-emergency indication be included in the paging message or does not make the emergency or non-emergency indication be included in the paging message, and send the paging message to the home base station gateway.

If the mobility management unit is one configured to use the paging optimization, the mobility management unit determines whether to page some home base station gateways, these home base station gateways being only connected with the CSG-mode home base station that does not authorize the UE in the tracking area list registered by the UE, in the tracking area list registered by the UE according to the received downlink data notification. If the downlink data notification includes the non-emergency indication or does not include the emergency or non-emergency indication, it opts for not paging the home base station gateways only corresponding to the CSG-mode home base station that does not authorize the UE in the tracking area list registered by the UE, but paging other home base station gateways than the aforementioned home base station that does not authorize the UE in the tracking area list registered by the UE. And if the downlink data notification includes the emergency indication, it opts for paging all home base station gateways in the tracking area list registered by the UE.

If having not been configured to use the paging optimization, the mobility management unit directly pages all home base station gateways in the paging tracking list registered by the UE.

Step 705: The Home Base Station Gateway (HeNB GW/HNB GW) configured to use the paging optimization, after receiving the paging message from the mobility management unit, pages all base stations, including the CSG-mode home base station that does not authorize the UE, in the tracking area of the paging message according to the emergency indication in the paging message.

If the paging message includes a non-emergency indication or does not includes an emergency or non-emergency indication, the home base station gateway does not page the closed home base station that does not authorize the UE. At this point, the UE cannot use the normal service.

Step 706: The CSG-mode home base station pages the unauthorized UE.

Step 707: After receiving the paging, the UE initiates a service request flow, establishes a connection to an air interface of the network, and receives the emergency service downlink data from the core network gateway.

Fourth Embodiment

Figure 8:
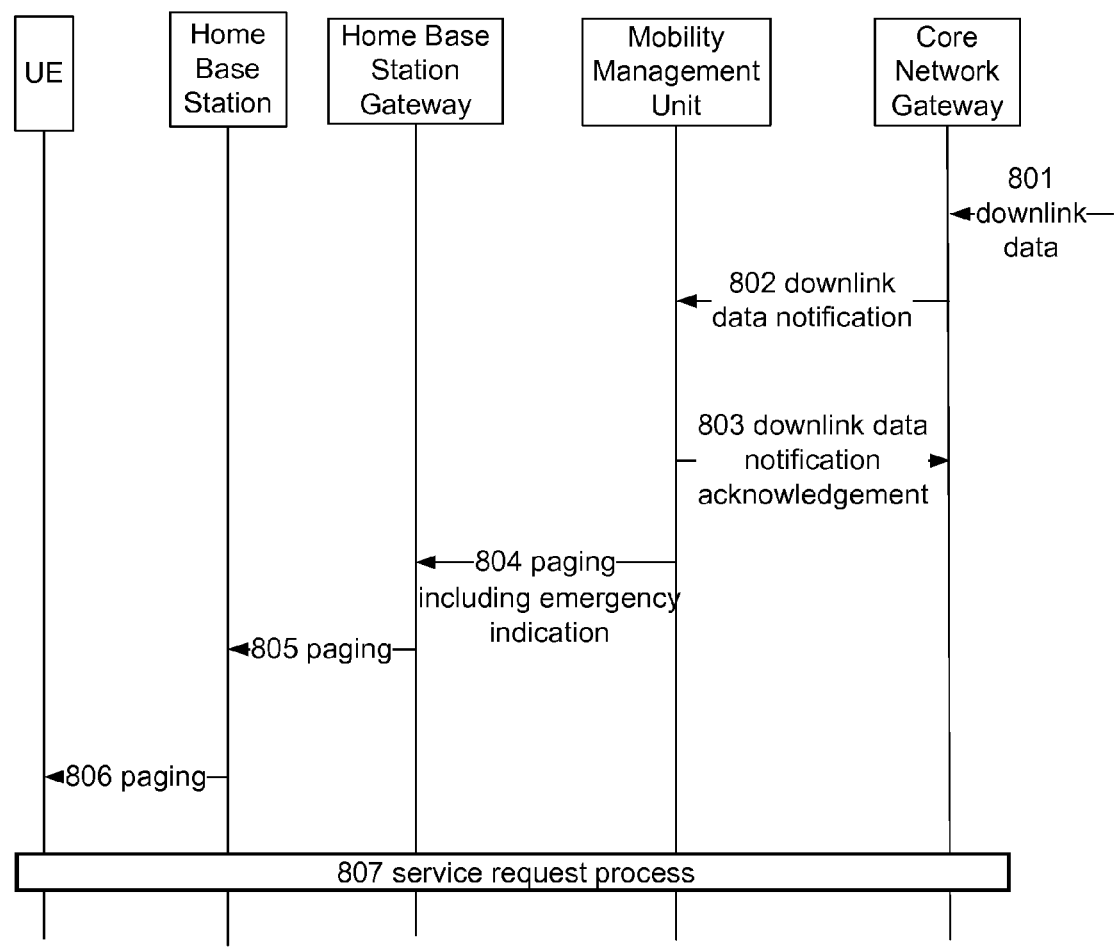

This embodiment is applied under the coverage of EUTRAN or UTRAN. The network architecture is shown in FIG. 1, 3 or 4, where a home base station is connected with a core network element through a home base station gateway. At this point, a UE that has established an emergency service bearer with a core network is in an idle state and resides in a CSG-mode home base station that does not authorize the UE. When the downlink emergency service data needs to be sent to the UE over the bearer, an MME/SGSN and the home base station gateway that have been configured to use the paging optimization initialize a paging to the UE. As illustrated in FIG. 8, the specific steps are specified below.

Step 801: The core network gateway, for example, SAE-GW for LTE access or GGSN for 3G access, receives a downlink data packet to be sent to the UE.

In this embodiment, the core network gateway does not need to check whether the service data included in the downlink data packet is the emergency service data.

Step 802: The core network gateway sends a downlink data notification to the Mobility Management Unit (MME or SGSN).

Step 803: The mobility management unit sends a downlink data notification acknowledgement to a gateway.

Step 804: The mobility management unit, after learning that the service data is to be sent the UE, checks the current service type of the UE, and, according to the emergency APN or emergency service special ARP in the service information of the UE saved thereby, if the UE currently has an emergency service, sends a paging message including an emergency indication and a tracking area where the home base station gateway is located in the tracking area list registered by the UE to all home base station gateways in the paging tracking list registered by the UE.

If having been configured to use the paging optimization, the mobility management unit determines whether to page some home base station gateways, which are only connected with the CSG-mode home base station that does not authorize the UE in the tracking area list registered by the UE, in the tracking area list registered by the UE according to whether the current service type of the UE has an emergency service. If the current service type of the UE does not have the emergency service, it opts not for paging the home base station gateways only corresponding to the CSG-mode home base station that does not authorize the UE in the tracking area list registered by the UE, but paging other home base station gateways than the CSG-mode home base station that does not authorize the UE in the tracking area list registered by the UE. And if the current service type of the UE has the emergency service, it opts for paging all home base station gateways in the tracking area list registered by the UE and including an emergency indication in the paging message.

If having not been configured to use the paging optimization, the mobility management unit directly pages all home base station gateways in the paging tracking list registered by the UE, and if the current service type of the UE has the emergency service, the paging message includes an emergency indication.

Step 805: the home base station gateway configured to use the paging optimization, after receiving the paging message from the mobility management unit, pages all base stations, including the CSG-mode home base station that does not authorize the UE, in the tracking area in the paging message according to the emergency indication in the paging message.

If the received paging message from the mobility management unit does not contain the emergency indication, the home base station gateway performs paging optimization, that is to say, the home base station gateway does not send the paging message to the CSG-mode home base station that does not authorize the UE. At this point the UE cannot perform normal service.

Step 806: The CSG-mode home base station that does not authorize the UE pages the unauthorized UE.

Step 807: After receiving the paging, the UE initiates a service request flow, establishes a connection to an air interface of the network, and receives the emergency service downlink data from the core network gateway.

The system (without home base station gateway) for paging an emergency service user in one embodiment of the disclosure comprises a core network gateway, a mobility management unit and a CSG-mode home base station, in which the core network gateway is for, after receiving a downlink data packet to be sent to a UE, notifying the mobility management unit the service data included in the downlink data packet is emergency service data when the service data included in the downlink data packet is the emergency service data;

the mobility management unit configured to use the paging optimization, after learning that the emergency data is to be sent to the UE, for sending a paging message to all home base stations, including the CSG-mode home base station that does not authorize the UE, in the paging tracking list registered by the UE; and the CSG-mode home base station is for paging the UE according to the received paging message.

The core network gateway is further for notifying the mobility management unit of the emergency service data to be sent to the UE by sending a downlink data notification including an emergency indication to the mobility management unit.

The system (without home base station gateway) for paging an emergency service user in one embodiment of the disclosure comprises a mobility management unit and a CSG-mode home base station, in which the mobility management unit configured to use the paging optimization, after learning that the emergency data is to be sent to a UE, for checking the current service type of the UE, and if the UE currently has an emergency service, sending a paging message to all home base stations, including the CSG-mode base station that does not authorize the UE, in the paging tracking list registered by the UE; and the CSG-mode home base station that does not authorize the UE is used for paging the UE according to the received paging message.

The system (with home base station gateway) for paging an emergency service user in one embodiment of the disclosure comprises a core network gateway, a mobility management unit, a home base station gateway and a CSG-mode home base station, in which the core network gateway is for, after receiving a downlink data packet to be sent to a UE, notifying the mobility management unit the service data included in the downlink data packet is emergency service data when the service data included in the downlink data packet is the emergency service data;

the mobility management unit is for, after learning that there is emergency service data to be sent to the UE, sending a paging message to all home base station gateways in the paging tracking list registered by the UE to notify the home base station gateways of the emergency service data to be sent to the UE;

the home base station gateway configured to use the paging optimization is for sending a paging message to page the corresponding base stations, including the CSG-mode home base station that does not authorize the UE, according to the received paging message; and the CSG-mode home base station is for paging the UE according to the received paging message.

The core network gateway is further for notifying the mobility management unit of the emergency service data to be sent to the UE by sending a downlink data notification including an emergency indication to the mobility management unit.

The mobility management unit is further for including an emergency indication and a tracking area where the home base station gateway is located in the tracking area list registered by the UE in the paging message, sending the paging message to the home base station gateway, and notifying the home base station gateway of the emergency service data to be sent to the UE; and the home base station gateway is further for learning that there is emergency service data to be sent to the UE according to the emergency indication in the paging message and paging all base stations in the tracking area of the paging message.

The system (with home base station gateway) for paging an emergency service user in one embodiment of the disclosure comprises a core network gateway, a mobility management unit, a home base station gateway and a CSG-mode home base station, in which the mobility management unit is for, after receiving a downlink data notification from the core network gateway, checking the current service type of the UE, and if the UE currently has an emergency service, paging all home base station gateways in the tracking area list registered by the UE, wherein the paging message includes an emergency indication;

the home base station gateway configured to use the paging optimization is for, after receiving the paging message from the mobility management unit, paging all base stations, including the CSG-mode home base station that does not authorize the UE, in the tracking area in the paging message according to the emergency indication in the paging message; and the CSG-mode home base station is for paging the UE according to the received paging message.

Of course, the present disclosure may have many other embodiments, and those skilled in the art may make various corresponding changes and variations without departing from the sprit and essence of the disclosure. However, such corresponding changes and variations shall pertain to the scope of protection of the appended claims.

What is claimed is:

1. A method for paging an emergency service user, comprising:

when a mobility management unit is configured to support paging optimization in a core network, not performing the paging optimization by the mobility management unit when a UE has an emergency bearer service;

wherein the step of that the mobility management unit configured to use the paging optimization does not perform the paging optimization when the UE has an emergency bearer service comprises:

after receiving a downlink data packet to be sent to the UE, a core network gateway notifies the mobility management unit that service data included in the downlink data packet is emergency service data when the service data included in the downlink data packet is the emergency service data;

after learning that the emergency data is to be sent to the UE, the mobility management unit configured to use the paging optimization sends a paging message to all base stations, including a CSG-mode (Closed Subscriber Group mode) home base station that does not authorize the UE, in a paging tracking list registered by the UE; and the CSG-mode home base station pages the UE.

2. The method according to claim 1, the step of that the mobility management unit configured to use the paging optimization does not perform the paging optimization when the UE has an emergency bearer service comprises:
after receiving the downlink data packet to be sent to the UE, the core network gateway notifies the mobility management unit that service data included in the downlink data packet is emergency service data when the service data included in the downlink data packet is the emergency service data;
after learning that there is the emergency service data to be sent to the UE, the mobility management unit sends the paging message to all home base station gateways in a paging tracking list registered by the UE to notify the home base station gateways that there is the emergency service data to be sent to the UE;
each of the home base station gateways configured to use the paging optimization paging all base stations, including the CSG-mode (Closed Subscriber Group mode) home base station that does not authorize the UE, in the tracking area in the paging message; and
the CSG-mode home base station pages the UE.

3. The method according to claim 1, wherein the step of that the mobility management unit configured to use the paging optimization does not perform the paging optimization when the UE has an emergency bearer service comprises:
after learning that the emergency data is to be sent to the UE, the mobility management unit configured to use the paging optimization checks a current service type of the UE, and when the UE currently has an emergency service, sends a paging message to all base stations, including the CSG-mode (Closed Subscriber Group mode) base station that does not authorize the UE, in a paging tracking list registered by the UE; and
the CSG-mode home base station that does not authorize the UE pages the UE.

4. The method according to claim 1, wherein the step of that the mobility management unit configured to use the paging optimization does not perform the paging optimization when the UE has an emergency bearer service comprises:
after receiving a downlink data notification from the core network gateway, the mobility management unit checking a current service type of the UE, and when the UE currently has the emergency service, pages all home base station gateways in a tracking area list registered by the UE, wherein an emergency indication is included in a paging message;
after receiving the paging message from the mobility management unit, the home base station gateway configured to use the paging optimization pages all base stations, including the CSG-mode (Closed Subscriber Group mode) home base station that does not authorize the UE, in the tracking area in the paging message according to the emergency indication in the paging message; and
the CSG-mode home base station pages the UE.

5. A method for paging an emergency service user, comprising:
after receiving a downlink data packet to be sent to a UE, a core network gateway notifying a mobility management unit that service data included in the downlink data packet is the emergency service data when the service data included in the downlink data packet is the emergency service data;
after learning that the emergency data is to be sent to the UE, the mobility management unit configured to use paging optimization for sending a paging message to all base stations, including a CSG-mode (Closed Subscriber Group mode) home base station that does not authorize the UE, in a paging tracking list registered by the UE; and
the CSG-mode home base station paging the UE.

6. The method according to claim 5, wherein,
the core network gateway notifies the mobility management unit that there is the emergency service data to be sent to the UE, by sending a downlink data notification including an emergency indication to the mobility management unit.

7. The method according to claim 5, wherein,
the core network gateway is a System Architecture Evolution Gateway (SAE-GW), and the mobility management unit is a Mobility Management Entity (MME).

8. A method for paging an emergency service user, comprising:
after receiving a downlink data packet to be sent to a UE, a core network gateway notifying a mobility management unit that service data included in the downlink data packet is emergency service data when the service data included in the downlink data packet is the emergency service data;
after learning that there is the emergency service data to be sent to the UE, the mobility management unit sending a paging message to all home base station gateways in a paging tracking list registered by the UE to notify the home base station gateways that there is the emergency service data to be sent to the UE;
each of the home base station gateways configured to use paging optimization paging all base stations, including a CSG-mode (Closed Subscriber Group mode) home base station that does not authorize the UE, in a tracking area in the paging message; and
the CSG-mode home base station paging the UE.

9. The method according to claim 8, wherein,
the core network gateway notifies the mobility management unit that there is the emergency service data to be sent to the UE, by sending a downlink data notification including an emergency indication to the mobility management unit.

10. The method according to claim 8, wherein,
the mobility management unit makes an emergency indication be included in the paging message, sends the paging message to the home base station gateways, and notifies the home base station gateways that there is the emergency service data to be sent to the UE; and
the paging message further includes a tracking area, where each of the home base station gateways is located, in the tracking area list registered by the UE.

11. The method according to claim 10, wherein,
the step of that each of the home base station gateways configured to use paging optimization pages all base stations in the tracking area of the paging message comprises:
each of the home base station gateways configured to use the paging optimization learns that there is emergency service data to be sent to the UE according to the emergency indication in the paging message; and
the home base station gateway pages all base stations in the tracking area of the paging message.

12. The method according to claim 8, wherein,
for a Long Term Evolution (LTE) access, the core network gateway is a System Architecture Evolution Gateway (SAE-GW), and the mobility management unit is a Mobility Management Entity (MME); and for a 3$^{rd}$ Generation (3G) access, the core network gateway is a Gateway GPRS Support Node (GGSN), and the mobility management unit is a Service GPRS Support Node (SGSN).

13. A method for paging an emergency service user, comprising:
after learning that emergency data is to be sent to a UE, a mobility management unit configured to use paging optimization checking a current service type of the UE, and when the UE currently has an emergency service, sending a paging message to all base stations, including a CSG-mode (Closed Subscriber Group mode) home base station that does not authorize the UE, in a paging tracking list registered by the UE; and
the CSG-mode home base station that does not authorize the UE paging the UE.

14. A method for paging an emergency service user, comprising:
a mobility management unit receiving a downlink data notification from a core network gateway, checking a current service type of a UE, and when the UE currently has an emergency service, paging all home base station gateways in a tracking area list registered by the UE, wherein an emergency indication is included in a paging message;
after receiving the paging message from the mobility management unit, a home base station gateway configured to use paging optimization paging all base stations, including a CSG-mode (Closed Subscriber Group mode) home base station that does not authorize the UE, in a tracking area in the paging message according to the emergency indication in the paging message; and
the CSG-mode home base station paging the UE.

15. A system for paging an emergency service user, comprising: a core network gateway, a mobility management unit, and a CSG-mode (Closed Subscriber Group mode) home base station, wherein,
the core network gateway is configured to, after receiving a downlink data packet to be sent to a UE, notify the mobility management unit that service data included in the downlink data packet is emergency service data when the service data included in the downlink data packet is the emergency service data;
the mobility management unit configured to use paging optimization is configured to, after learning that the emergency data is to be sent to the UE, send a paging message to all home base stations, including the CSG-mode home base station that does not authorize the UE, in a paging tracking list registered by the UE; and
the CSG-mode home base station is configured to page the UE according to the received paging message.

16. The system according to claim 15, wherein,
the core network gateway is further configured to notify the mobility management unit that there is the emergency service data to be sent to the UE by sending a downlink data notification including an emergency indication to the mobility management unit.

17. A system for paging an emergency service user, comprising: a core network gateway, a mobility management unit, a home base station gateway and a CSG-mode (Closed Subscriber Group mode) home base station, wherein,
the core network gateway is configured to, after receiving a downlink data packet to be sent to a UE, notify the mobility management unit that service data included in the downlink data packet is emergency service data when the service data included in the downlink data packet is the emergency service data;

the mobility management unit is configured to, after learning that there is the emergency service data to be sent to the UE, send a paging message to all home base station gateways in a paging tracking list registered by the UE to notify the home base station gateways that there is the emergency service data to be sent to the UE;
each of the home base station gateways configured to use paging optimization is configured to send the paging message to page corresponding base stations, including the CSG-mode home base station that does not authorize the UE, according to the received paging message; and
the CSG-mode home base station is configured to page the UE according to the received paging message.

18. The system according to claim 17, wherein,
the core network gateway is further configured to notify the mobility management unit that there is the emergency service data to be sent to the UE by sending a downlink data notification including an emergency indication to the mobility management unit.

19. The system according to claim 17, wherein
the mobility management unit is further configured to make an emergency indication and a tracking area, where each of the home base station gateways is located in the tracking area list registered by the UE, be included in the paging message, send the paging message to the home base station gateway, and notify the home base station gateways that there is the emergency service data to be sent to the UE; and
each of the home base station gateways is further configured to learn that there is the emergency service data to be sent to the UE according to the emergency indication in the paging message and page all the base stations in the tracking area of the paging message.

20. A system for paging an emergency service user, comprising: a mobility management unit, and a CSG-mode (Closed Subscriber Group mode) home base station, wherein,
the mobility management unit configured to use paging optimization is configured to, after learning that the emergency data is to be sent to the UE, check a current service type of a UE, and when the UE currently has an emergency service, send a paging message to all base stations, including the CSG-mode home base station that does not authorize the UE, in a paging tracking list registered by the UE; and
the CSG-mode home base station is configured to page the UE according to the received paging message.

21. A system for paging an emergency service user, comprising: a core network gateway, a mobility management unit, a home base station gateway and a CSG-mode (Closed Subscriber Group mode) home base station, wherein,
the mobility management unit is configured to, after receiving a downlink data notification from the core network gateway, check a current service type of a UE, and if when the UE currently has an emergency service, page all home base station gateways in a tracking area list registered by the UE, wherein the paging message includes an emergency indication;
each of the home base station gateways configured to use paging optimization is configured to, after receiving the paging message from the mobility management unit, paging all base stations, including the CSG-mode home base station that does not authorize the UE, in a tracking area in the paging message according to the emergency indication in the paging message; and
the CSG-mode home base station is configured to page the UE according to the received paging message.

* * * * *